United States Patent
Kleine-Brockhoff et al.

(10) Patent No.: US 9,394,971 B2
(45) Date of Patent: Jul. 19, 2016

(54) PLANET WEB FOR CONNECTING TWO PLANET WEB CHEEKS

(71) Applicant: Robert Bosch GmbH, Stuttgart (DE)

(72) Inventors: Ralf Kleine-Brockhoff, Dorsten (DE); Dominikus Daners, Herten (DE); Marco Lehmann, Wuppertal (DE); Claudia Schweihoff, Bochum (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 178 days.

(21) Appl. No.: 13/920,471

(22) Filed: Jun. 18, 2013

(65) Prior Publication Data
US 2013/0337968 A1  Dec. 19, 2013

(30) Foreign Application Priority Data
Jun. 18, 2012 (DE) .......................... 10 2012 012 098

(51) Int. Cl.
| F16H 1/28 | (2006.01) |
| F16H 57/00 | (2012.01) |
| F03D 11/02 | (2006.01) |
| F16H 57/08 | (2006.01) |

(52) U.S. Cl.
CPC *F16H 1/28* (2013.01); *F03D 11/02* (2013.01); *F16H 57/082* (2013.01); *F05D 2260/40311* (2013.01); *Y02E 10/722* (2013.01); *Y02P 70/523* (2015.11)

(58) Field of Classification Search
CPC .................................. F16H 1/28; F16H 57/082
See application file for complete search history.

(56) References Cited

U.S. PATENT DOCUMENTS

| 3,939,736 A | * | 2/1976 | Morin | F16H 57/082 475/331 |
| 4,157,668 A | * | 6/1979 | Fukuma | F16H 57/0487 475/159 |
| 4,296,648 A | * | 10/1981 | Okano | F16H 13/08 475/159 |
| 5,851,163 A | * | 12/1998 | Kawase | F16H 57/0487 475/183 |
| 6,039,667 A | * | 3/2000 | Schunck | F16H 57/0427 184/11.4 |
| 2004/0247437 A1 | * | 12/2004 | Otaki | F03D 11/02 416/132 B |
| 2010/0202885 A1 | * | 8/2010 | Demtroder | F03D 11/02 416/170 R |
| 2013/0023378 A1 | * | 1/2013 | McCune | F16H 57/082 475/344 |

FOREIGN PATENT DOCUMENTS

| CN | 200986018 Y | 12/2007 |
| CN | 201916470 U | 8/2011 |
| DE | 74 01 523 U | 5/1975 |
| EP | 1186804 A1 * | 3/2002 ............ F16H 57/082 |
| EP | 2 559 913 A1 | 2/2013 |
| JP | 1-121747 U | 8/1989 |
| JP | 7-113444 A | 5/1995 |
| JP | 7-332475 A | 12/1995 |
| JP | 2006-90739 A | 4/2006 |
| JP | WO2011029076 A1 * | 10/2011 ............ F16H 57/082 |
| WO | 2013/065024 A1 | 5/2013 |

* cited by examiner

*Primary Examiner* — Tisha Lewis
(74) *Attorney, Agent, or Firm* — Maginot, Moore & Beck LLP

(57) ABSTRACT

A planet web for connecting two planet web cheeks to form a planet wheel space of a planet carrier of a planet gear has, in the axial direction of the planet carrier, a cavity delimited by peripheral walls. A planet carrier includes the planet web and is improved in relation to the prior art, in particular from a production engineering aspect. This improvement is achieved by the planet web having at least one breach arranged in a peripheral wall of the planet web, which connects the cavity to the planet wheel space. A corresponding planet carrier, a casting core, and a method for manufacturing a planet carrier includes the planet web having the at least one breach.

18 Claims, 5 Drawing Sheets

PLANET WEB FOR CONNECTING TWO PLANET WEB CHEEKS

This application claims priority under 35 U.S.C. §119 to patent application no. DE 10 2012 012 098.2, filed on Jun. 18, 2012 in Germany, the disclosure of which is incorporated herein by reference in its entirety.

BACKGROUND

The disclosure relates to a planet web for connecting two planet web cheeks to form a planet wheel space of a planet carrier of a planetary gear, wherein the planet web has, in the axial direction of the planet carrier, a cavity delimited by peripheral walls. The disclosure additionally relates to a casting core for the manufacture of such a planet carrier and to a method for manufacturing a planet carrier in a casting mold.

A planet web of the generic type is known from CN 200986018Y. The planet carrier described in this utility model has three planet carriers, which are arranged distributed in the peripheral direction and have a cavity delimited by peripheral walls. This cavity helps to reduce the weight in relation to known solidly configured planet webs.

The object of the disclosure is to define a planet web for a planet carrier, in addition to a correspondingly configured planet carrier, and also to define a casting core and a method for manufacturing such a planet carrier, which casting core/method is improved in relation to the prior art, in particular from a production engineering aspect.

SUMMARY

This object is achieved by virtue of the fact that the planet web has at least one breach, which is arranged in a peripheral wall of the planet web and connects the cavity to the planet wheel space. The corresponding casting core or the corresponding method for manufacturing a planet carrier in a casting mold provides that a single casting core for the planet carrier is provided for insertion into a casting mold, and that a part-core of the casting core which forms the planet wheel space and a part-core of the casting core which forms the cavity are connected to each other by at least one breach in a peripheral wall of the web. The manufacturing process is thereby improved insofar as only a single casting core, possibly formed of part-cores, is provided, which casting core is inserted into a corresponding casting mold. A single casting core has the advantage that the risk of displacement or breaking-off of individual casting cores inserted into the casting mold is precluded. Manufacturing defects, which can be triggered, for example, by an incorrect insertion of individual casting cores into the casting mold, are also reliably avoided. Finally, a weight reduction, and thus a material saving, is achieved by the cavity formed on the planet web. The inventive breach in the peripheral wall of the planet web is configured and arranged such that no weakening of the connection of the planet web cheeks, which connection is constituted by the planet web, occurs.

In a refinement of the disclosure, at least one breach is/are respectively arranged in two at least approximately opposite situated peripheral walls. This embodiment ensures that the part-core for the cavity and the part-core for the planet wheel space are securely connected to each other on two opposite sides.

In a further embodiment of the disclosure, the breach is configured as an interrupted wall (of the peripheral wall). The breach can thus be configured as an opening in a peripheral wall which is present, or else the peripheral wall, at least in a part-region, can be completely removed and thus be configured as an interrupted wall. In this context, it is expedient to interrupt the wall, in particular, in regions which are only subjected to low loads. This breach, which is aligned, in particular, to a bearing bore for a sun wheel and which thus creates an inwardly open planet web, is a stand-alone inventive concept, independently of the disclosure which is described here.

In a refinement of the disclosure, the breaches are arranged non-symmetrically in the peripheral walls. As a result of this non-symmetrical arrangement, different loads of the planet carrier can be taken into account, or else desired lubricating effects of the planet carrier rotating in an oil bath, for lubricating the gearwheels of the planetary gear, can be obtained.

In a further embodiment of the disclosure, the breach is formed by a casting core. The casting core forming the breach here has a design which makes good sense from a casting engineering aspect, for example in a round form, in a heart-shaped form, in the form of a rounded triangle, in a spade-shaped design, having an asymmetrical contour, having an inner bulge, having an outer bulge. One or more such forms for the design of the casting core can be mutually combined.

In a refinement of the disclosure, the cavity is at least partially closed off on one side. A partial closure ensures that there is no local overheating of the casting core in the course of the casting, so that possible burning away of the casting core is reliably prevented. The quality of the cast is thereby enhanced. Within the scope of the disclosure, it is also possible, however, to configure the cavity with a design which is closed on one side in the axial direction. Such a design can be sensible, for example, with respect to particular strength requirements.

In a further embodiment of the disclosure, the breach fully cuts away a radially inward pointing region of at least one peripheral wall. This is preferably that region of the planet web which points toward a bearing bore for a sun wheel. This region is subjected only to very low load with respect to the forces to be transmitted and can therefore be wholly dispensed with, for example, for a further weight reduction.

In a further embodiment of the disclosure, the inner peripheral wall has a constriction protruding into the cavity. The constriction can here become larger in diameter axially to the middle between the two planet webs. This embodiment can be realized without difficulty from a casting engineering aspect and has advantages, for example, with respect to the strength and rigidity of the planet web.

In a refinement of the disclosure, at least one planet web cheek has, in the region of the planet web, a rounded contour protruding into the planet web, in particular in the form of a concave contour, quite preferably in the form of a spherical cap. Preferably, both planet web cheeks are configured with such a spherical cap. Once again in a refinement of the disclosure, a breach opening can here be recessed into the rounded contour. This breach opening, which can be arranged on one side or on both sides, can likewise be formed by the casting core, at virtually no additional cost. By virtue of this design, the rigidity of the thus configured planet carrier is further increased, at the same time as material savings, and thus a reduction in weight, are obtained.

Preferably, the planet carrier has three bores, arranged distributed on the periphery, for the reception of shafts bearing planet wheels, which shafts are bordered by likewise three planet webs, arranged in the interspaces between the bores. All in all, the inventive design of the planet web, the planet carrier and the corresponding casting mold offers the advantage of a modular construction, since, with a casting box consisting of top part and bottom part and a wide variable casting core, a plurality of different planet webs of a production series can be produced.

In addition, the casting core can be configured such that the wall thickness of the walls is variably configured. For example, the wall thickness can decrease in the inward direction owing to the lower loads. Moreover, the breach can be surrounded by beads, ribs and stiffenings.

BRIEF DESCRIPTION OF THE DRAWINGS

Further advantageous embodiments of the disclosure can be derived from the drawing description, in which illustrative embodiments of the disclosure which are represented in the figures are described in greater detail, wherein.

DETAILED DESCRIPTION

Figure 1:
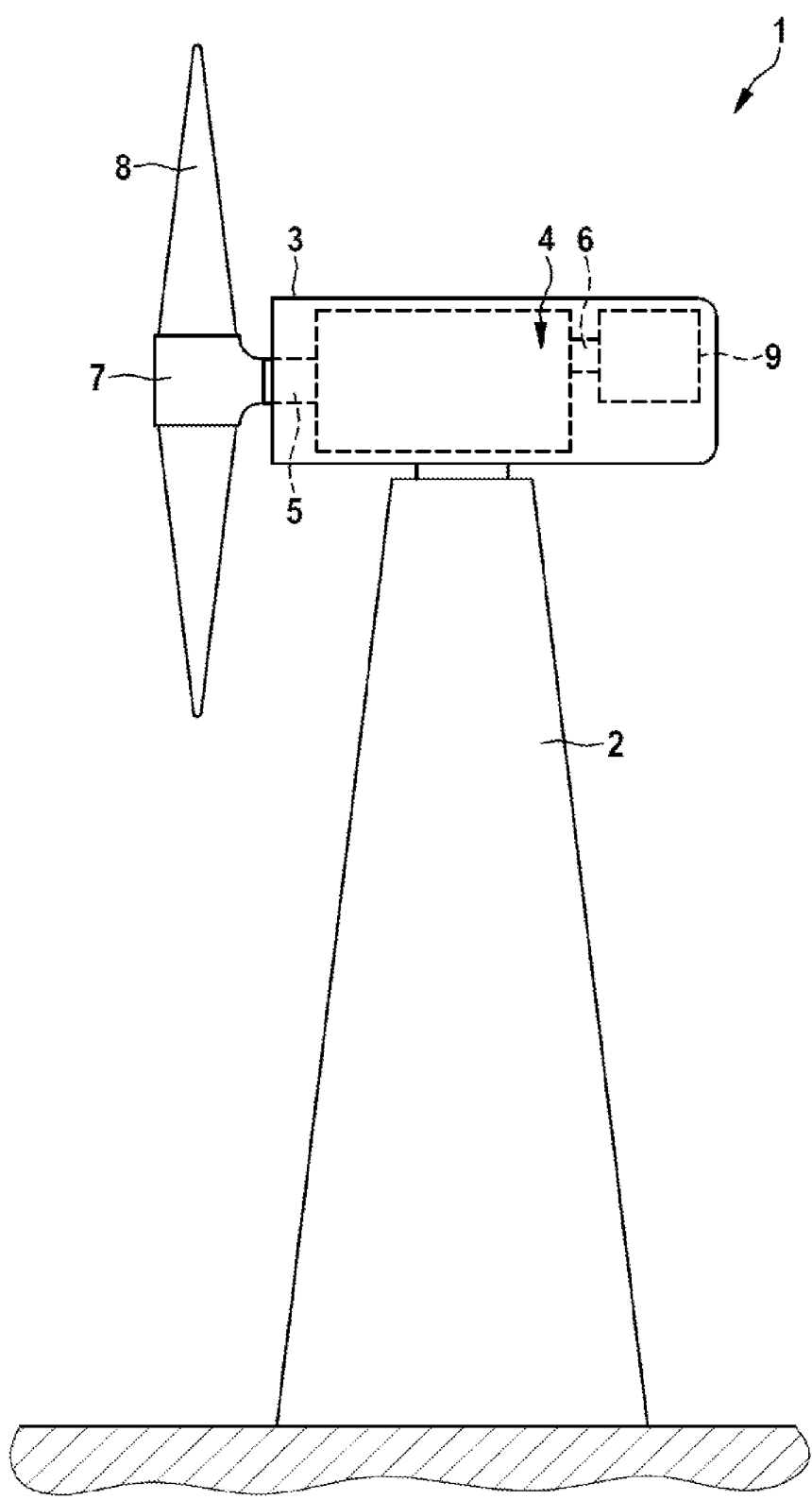
FIG. 1 shows a schematic side view of a wind turbine having an inventively designed planet carrier or planet web of the planet carrier of a generator gear unit.

FIG. 1 shows a side view of a wind turbine 1 with its basic structural components. The wind turbine 1 has a tower 2, on which a gondola 3 in the form of a machine housing, which gondola is mounted rotatably about a vertical axis, is arranged. In the gondola 3, a generator gear unit 4 is fastened in a rotationally secure manner, wherein the generator gear unit 4 has a drive shaft 5 and an output shaft 6. The drive shaft 5 of the generator gear unit 4 is connected to a hub 7 of a rotor having a plurality of rotor blades 8. The output shaft 6 is rotationally connected to a drive apparatus to be driven, in the form of a generator 9. The generator gear unit 4 is designed such that it translates a slow rotary motion of the drive shaft 5 into a rapid rotary motion of the output shaft 6. To this end, the generator gear unit 4 has one or more planetary stages, which cooperate with the output shaft 6 via a final spur gear. It is also possible, however, to omit the spur gear if the planetary stages cooperate on the output side directly with the output shaft 6. A generator gear unit 4 of this kind is preferably configured as a medium-speed single-stage or multistage planetary gear.

At least one of the planetary stages of the generator gear unit 4 has an inventively configured planet carrier. By means of the wind turbine 1, electrical energy is generated in that the rotor set in rotary motion by the wind transmits the rotary motion to the drive shaft 5 and into the generator gear unit 4. The generator gear unit 4 translates the rotary motion into a more rapid rotary motion and finally, via the output shaft 6, the rapid rotary motion is transmitted to the generator to generate electricity.

Figure 2:
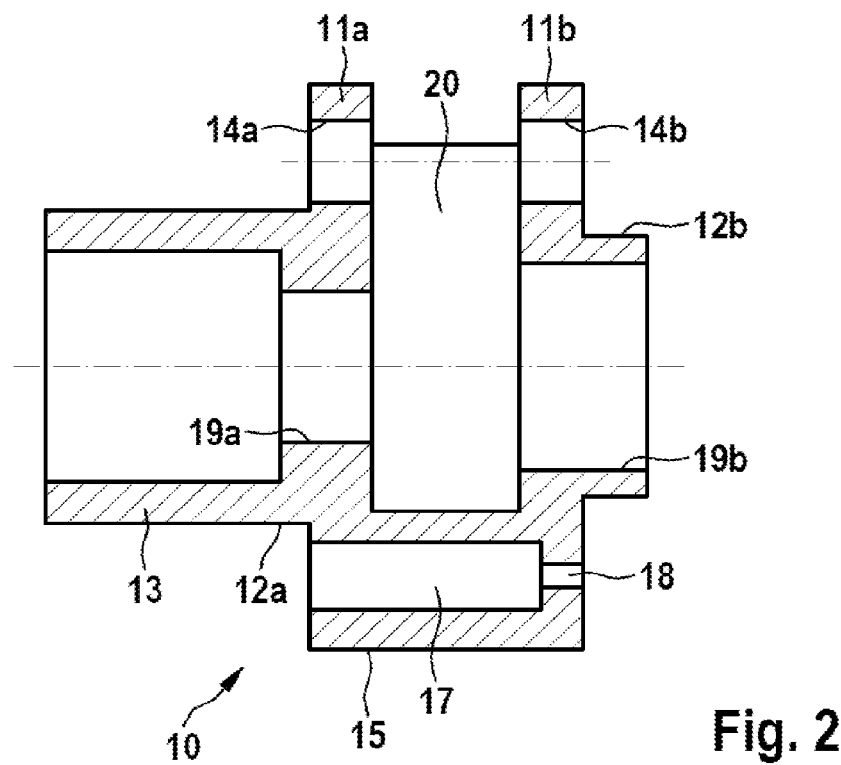
FIG. 2 shows a longitudinal section through an inventively configured planet carrier having a cavity formed in a planet web, which cavity is open on one side and partially closed off on one side.

FIG. 2 shows a longitudinal section through an inventively configured planet carrier 10 of a planetary stage which is installed in the generator gear unit 4. The planet carrier 10 is mounted in a housing of the generator gear unit 4 and has two bearing regions 12a, 12b, which are arranged alongside two planet web cheeks 11a, 11b and onto which roller bearings and/or slide bearings are placed, which, for their part, are arranged in the housing or a housing part. The left planet web cheek 11a is connected to a tubular extension 13 connecting to the bearing region 12a, via which a rotary motion is transmitted into the planet carrier 10.

In the upper region of the planet carrier 10, bores 14a, 14b are incorporated in the planet web cheeks 11a, 11b, into which a shaft bearing a planet wheel is inserted. One of these bores can selectively also be configured as a blind hole bore which does not breach the full diameter of a planet web cheek 11a, 11b. As can be seen from FIGS. 4 and 5, three such interacting bores 14a, 14b are arranged distributed on the periphery of the planet web cheeks 11a, 11b. Between the planet web cheeks 11a, 11b, the planet wheel space 20 accommodating the planet wheels is formed in the region surrounding the bores 14a, 14b, and outside the planet webs 15. On the opposite, lower side of the planet carrier 10 is represented a planet web 15, which connects the planet web cheeks 11a, 11b to each other and which has a cavity 17 arranged in the axial direction of the planet carrier 10 and delimited by peripheral walls 16 (see FIGS. 4 and 5). The cavity 17 is open in the region of the planet web cheek 11a and partially closed off in the region of the planet web cheek 11b, with the formation of a breach 18. As can likewise be seen from FIGS. 4 and 5, three such planet webs 15 (also referred to as hearts) are arranged distributed on the periphery of the planet web cheeks 11a, 11b between the bores 14a, 14b.

The planet web cheeks 11a, 11b additionally have central passages 19a, 19b, for example in the form of bores. In this region, the sun wheel is positioned between the planet web cheeks 11a, 11b and supported by the planet wheels. The thus configured and mounted planet carrier 10 is then inserted in its entirety into the housing of the generator gear unit 4, cooperating with a hollow wheel engaging in the planet wheels. The planet web cheek 11a, the rotor-side cheek and the planet web cheek 11b is here the generator-side cheek of the generator gear unit 4.

Figure 3:
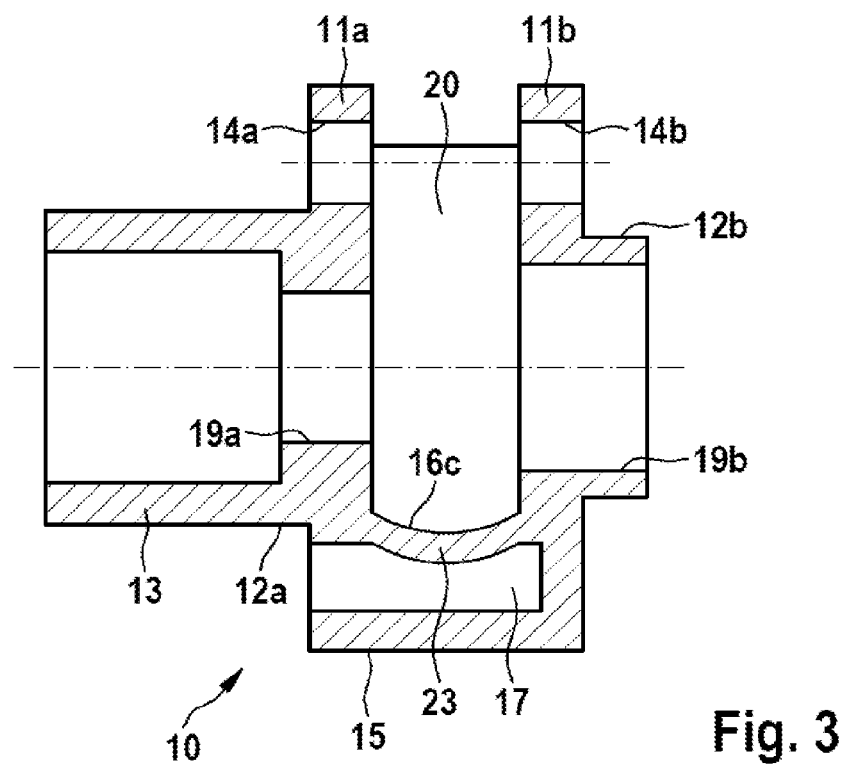
FIG. 3 shows a longitudinal section through a planet carrier similar to FIG. 2, wherein in this case the cavity in a planet web is completely closed off on one side.

The planet carrier according to FIG. 3 differs from the planet carrier according to FIG. 2 only in that in this case the cavity 17, in the region of the planet web cheek 11b, is fully closed off. It is here further represented that the inner peripheral wall 16c has a constriction 23 protruding into the cavity 17.

Figure 4:
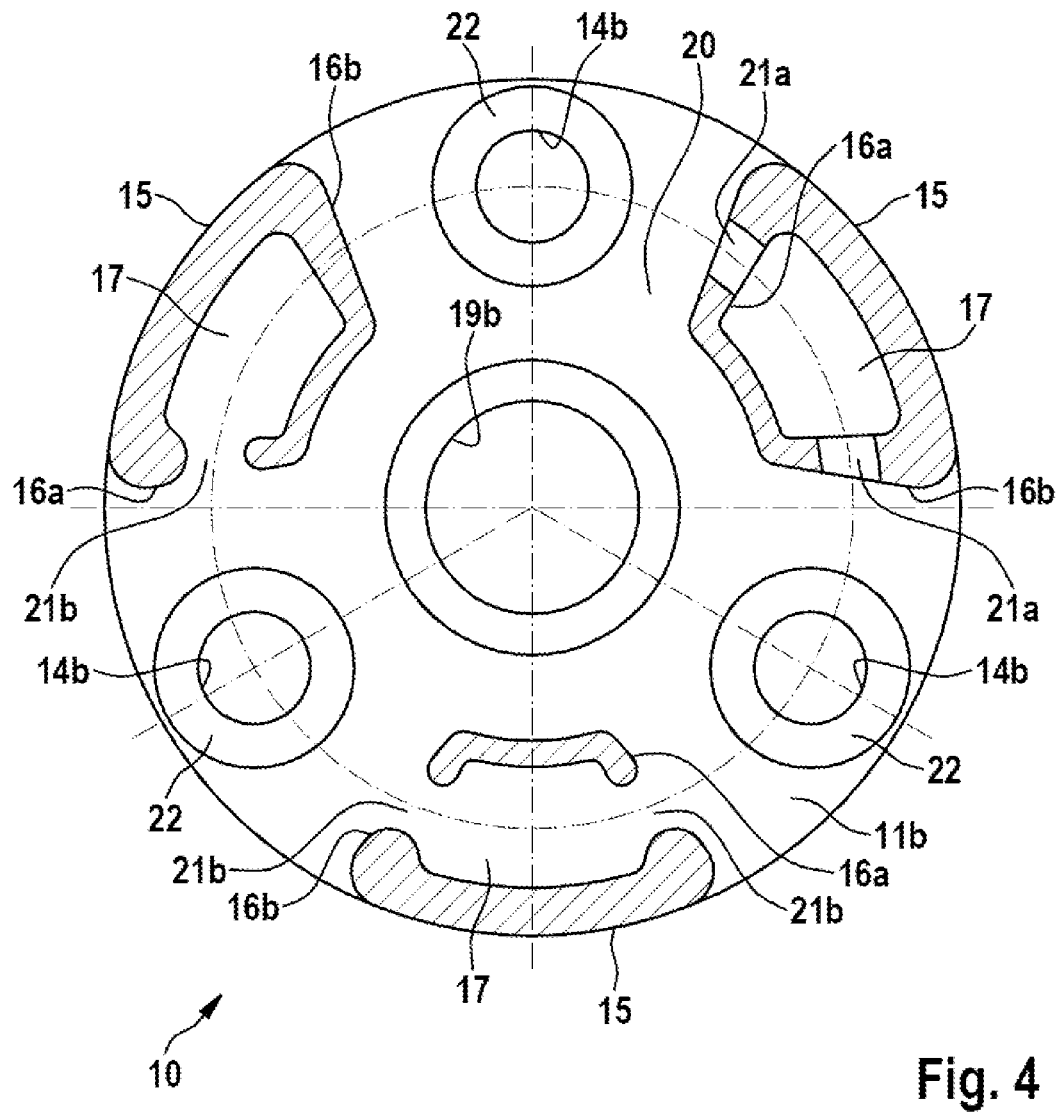
FIG. 4 shows a cross section through a planet carrier having three different designs of the planet webs.

FIG. 4 shows a cross section through the planet carrier 10, wherein a plurality of possible embodiments of the planet webs 15 are here represented in combination. The planet carrier 10 has the central passage 19b in the planet web cheek 11b. Around this central passage 19b, the three bores 14b are arranged in the planet web cheek 11b at intervals of 120 degrees, and offset by 60 degrees thereto are arranged the three planet webs 15, which connect the planet web cheek 11b to the planet web cheek 11a (not visible here). The bores 14a, 14b can have circumferential and/or encircling reinforcing ribs 22. Between the planet web cheeks 11a, 11b, the planet wheel space 20 accommodating the planet wheels is formed in the region outside the planet webs 15, while the planet webs 15 delimit with their peripheral walls 16 the respective cavity 17.

Recessed in the approximately opposite situated peripheral walls 16a, 16b of the right, upper planet web 15 are breaches 21a, which are formed by a common casting core for the formation of the cavity 17 and planet wheel space 20. In the lower, middle planet web 15, the breaches 21b are configured such that the peripheral walls 16a, 16b are here configured as interrupted walls. The same applies in principle to the left, upper planet web 15, though in this case only one breach, interrupting the peripheral wall 16a, is provided, while the peripheral wall 16b is closed.

Figure 5:
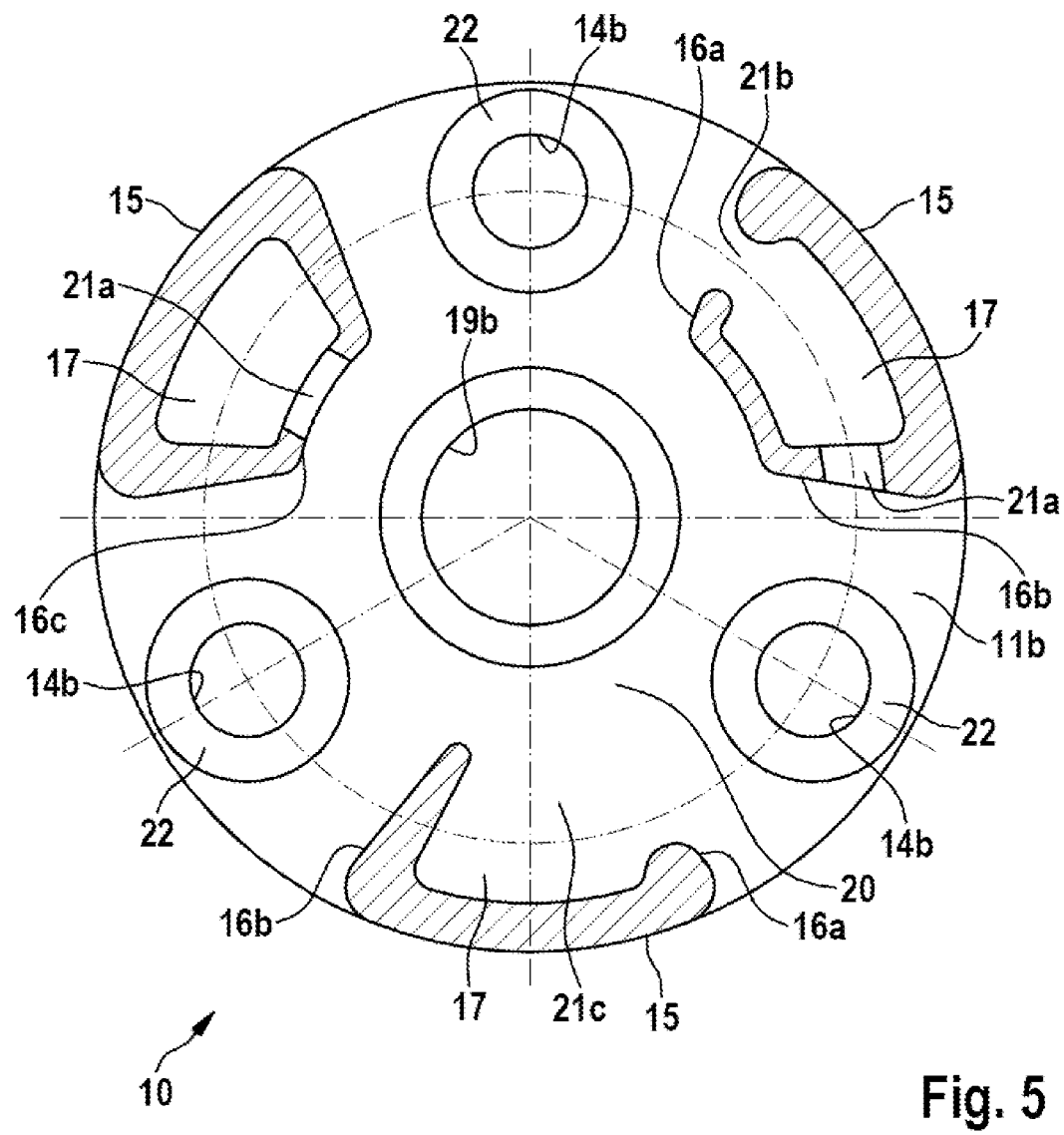
FIG. 5 shows a cross section through a planet carrier similar to FIG. 4, having a further three differently configured planet webs.

FIG. 5 shows further construction variants of the planet webs. In the right, upper planet web 15, a combination of a simple breach 21a (peripheral wall 16b) and a breach 21b which completely interrupts the peripheral wall 16a is represented. When the planet carrier 10 is rotated to the left, the thus configured planet web 15 intrudes into the oil sump of the generator gear unit 4 and scoops oil into the cavity 17 (oil also flows through the axial openings or possibly existing breaches 18 into the cavity), which oil is then, upon further rotation, fed specifically to individual bearings and/or gearwheels. The lubrication of the individual gearwheels of the planetary stage can thereby be improved, in particular in the case of a slowly rotating planet carrier 10.

In the lower, middle planet web 15, a radially inward pointing region of the peripheral wall 16 is fully cut away by the breach 21c, wherein the measure of the cutaway on the peripheral walls 16a, 16b—as represented—can be differently realized. In the left, upper planet web 15, a simple breach 21a is arranged in the radially inward pointing peripheral wall 16c.

Figure 6:
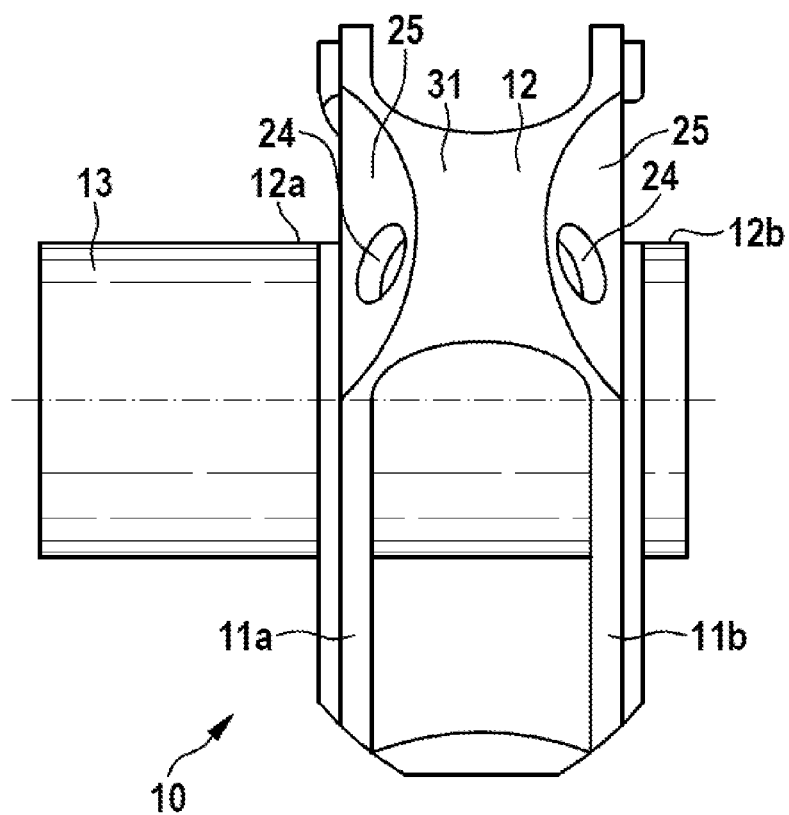
FIG. 6 shows a side view of a planet carrier.

FIG. 6 shows a side view of a planet carrier, supplementary to the sectional representations of FIGS. 2 and 3. Supplementary to the description in this respect, it can be seen here that both planet web cheeks 11a, 11b have in the region of the planet web 15 a rounded contour, protruding into the planet web 15, in the form of a spherical cap 25, into which breach openings 24 are additionally recessed.

Finally, it is pointed out that the represented illustrative embodiments of the disclosure can be mutually combined according to choice.

REFERENCE SYMBOL LIST 1 wind turbine
2 tower
3 gondola
4 generator gear unit
5 drive shaft
6 output shaft
7 hub
8 rotor blade
9 generator
10 planet carrier
11a, 11b planet web cheek
12a, 12b bearing region
13 tubular extension
14a, 14b bore
15 planet web
16a, 16b, 16c peripheral wall
17 cavity
18 breach
19a, 19b bearing bore
20 planet wheel space
21a, 21b, 21c breach
22 reinforcing rib
23 constriction
24 breach opening
25 spherical cap

What is claimed is:

1. A planet web for connecting two planet web cheeks to form a planet wheel space of a planet carrier of a planetary gear, comprising:
   peripheral walls delimiting a cavity in the planet web in the axial direction of the planet carrier,
   wherein the planet web has at least one breach arranged in a peripheral wall of the planet web, the breach connecting the cavity to the planet wheel space, and
   wherein the at least one breach fully cuts away a radially inward pointing region of at least one peripheral wall.

2. The planet web according to claim 1, wherein the breach is respectively arranged in two at least approximately opposite situated peripheral walls.

3. The planet web according to claim 1, wherein the breach is configured as an interrupted wall.

4. The planet web according to claim 2, wherein the breaches are arranged non-symmetrically in the peripheral walls.

5. The planet web according to claim 1, wherein the breach is formed by a casting mold.

6. The planet web according to claim 1, wherein the breach is formed by a common casting core for formation of the cavity and the planet wheel space.

7. The planet web according to claim 1, wherein an inner peripheral wall has a constriction protruding into the cavity.

8. The planet web according to claim 6, wherein the breach is configured to have one or more of a round form, a heart-shaped form, a form of a rounded triangle, a spade-shaped design, an asymmetrical contour, an inner bulge, and an outer bulge.

9. A planet carrier, comprising:
   a planet web for connecting two planet web cheeks to form a planet wheel space of a planet carrier of a planetary gear, the planet web including:
   peripheral walls delimiting a cavity in the planet web in the axial direction of the planet carrier,
   wherein the planet web has at least one breach arranged in a peripheral wall of the planet web, the breach connecting the cavity to the planet wheel space, and
   wherein at least one planet web cheek of the two planet web cheeks has a rounded contour protruding into the planet web in the region of the planet web.

10. The planet web according to claim 9, wherein the planet web cheek forms a breach opening in the region of the rounded contour.

11. The planet carrier according to claim 9, wherein the planet carrier is part of a flow turbine gear unit.

12. The planet web according to claim 9, wherein the rounded contour is in the form of one or more of a concave contour and a spherical cap.

13. The planet carrier according to claim 11, wherein the planet carrier is part of a tidal turbine gear unit or a wind turbine gear unit.

14. A casting core for the manufacture of a planet carrier, the planet carrier including two planet web cheeks connected to each other by at least one planet web and enclose a planet wheel space, the planet web having, in the axial direction of the planet carrier, peripheral walls that delimit a cavity, the casting core comprising:
   a common casting core configured to be inserted into a casting mold, the casting core including a first part-core forming the planet wheel space and a second part-core forming the cavity,
   wherein the first part-core and the second part-core are connected to each other by at least one breach in a peripheral wall of the planet web.

15. The casting core according to claim 14, wherein the casting core forms a breach opening.

16. A planet web for connecting two planet web cheeks to form a planet wheel space of a planet carrier of a planetary gear, comprising:

peripheral walls delimiting a cavity in the planet web in the axial direction of the planet carrier, wherein the planet web has at least one breach arranged in a peripheral wall of the planet web, the breach connecting the cavity to the planet wheel space, and wherein the breach is formed by a common casting core for formation of the cavity and the planet wheel space.

17. The planet web according to claim 16, wherein the breach is configured as an interrupted wall.

18. The planet web according to claim 16, wherein the breach is configured to have one or more of a round form, a heart-shaped form, a form of a rounded triangle, a spade-shaped design, an asymmetrical contour, an inner bulge, and an outer bulge.

* * * * *